United States Patent
Tsukagoshi et al.

(10) Patent No.: US 7,532,373 B2
(45) Date of Patent: May 12, 2009

(54) HOLOGRAPHIC RECORDING METHOD, HOLOGRAPHIC RECORDING APPARATUS, HOLOGRAPHIC MEMORY REPRODUCING METHOD, HOLOGRAPHIC MEMORY REPRODUCING APPARATUS, HOLOGRAPHIC RECORDING AND REPRODUCING APPARATUS, AND HOLOGRAPHIC RECORDING MEDIUM

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 273 days.

(21) Appl. No.: 10/577,650

(22) PCT Filed: Oct. 27, 2004

(86) PCT No.: PCT/JP2004/015919

§ 371 (c)(1),
(2), (4) Date: May 1, 2006

(87) PCT Pub. No.: WO2004/047987

PCT Pub. Date: May 26, 2005

(65) Prior Publication Data

US 2007/0081206 A1    Apr. 12, 2007

(30) Foreign Application Priority Data

Nov. 12, 2003    (JP) .............................. 2003-383174

(51) Int. Cl.
*G03H 1/28*    (2006.01)
*G11B 7/00*    (2006.01)

(52) U.S. Cl. ....................................... 359/24; 369/103

(58) Field of Classification Search .................... 359/1, 359/22, 24; 369/103, 272.1–291.1
See application file for complete search history.

(56) References Cited

U.S. PATENT DOCUMENTS

| | | | |
|---|---|---|---|
| 6,721,076 B2 * | 4/2004 | King et al. | 359/35 |
| 7,254,105 B2 * | 8/2007 | El Hafidi et al. | 369/103 |
| 2002/0114027 A1 | 8/2002 | Horimai | |
| 2003/0067639 A1 * | 4/2003 | Wilson et al. | 359/10 |

FOREIGN PATENT DOCUMENTS

JP    A-11-311937    11/1999

OTHER PUBLICATIONS

Burr et al.; "Content-addressable data storage by use of volume holograms"; *Applied Optics*; vol. 38, No. 32; pp. 6779-6784; Nov. 10, 1999.

* cited by examiner

*Primary Examiner*—Alessandro Amari
(74) *Attorney, Agent, or Firm*—Oliff & Berridge, PLC

(57) ABSTRACT

The pitch of light beam spots on a light receiving surface of an address detector upon search of information recorded on a holographic recording medium is decreased to reduce a distance between the holographic recording medium and the address detector. In a holographic recording and reproducing apparatus 10, a reference beam having an elliptical beam shape transformed by a beam shaping optical system 30 and an object beam having an unchanged circular shape are projected onto a holographic recording medium 20 so that interference fringes are allowed to be formed only within the elliptical shape. Therefore, even when the distance of an address detector 28 from the holographic recording medium 20 is reduced, crosstalk is prevented between array-shaped two-dimensional photodetectors 28A, 28B, 28C, and so on constituting the address detector 28.

14 Claims, 5 Drawing Sheets (A)

(B)

HOLOGRAPHIC RECORDING METHOD, HOLOGRAPHIC RECORDING APPARATUS, HOLOGRAPHIC MEMORY REPRODUCING METHOD, HOLOGRAPHIC MEMORY REPRODUCING APPARATUS, HOLOGRAPHIC RECORDING AND REPRODUCING APPARATUS, AND HOLOGRAPHIC RECORDING MEDIUM

TECHNICAL FIELD

This invention relates to a holographic recording method for recording information by forming interference fringes of an object beam and a reference beam on a holographic recording medium, a holographic recording apparatus for recording information, a holographic memory reproducing method and apparatus for reproducing holographic-recorded information, a holographic recording and reproducing apparatus for holographic recording-reproducing, and a holographic recording medium in which information is formed by means of interference fringes.

BACKGROUND ART

As one of the conventional holographic recording methods of this type, an angle multiplex holographic recording method is known in which the incident angle of a reference beam with respect to a holographic recording medium is modulated while an object beam is fixed. In this case, the beam shapes of the object beam and the reference beam are both circular.

In a holographic recording medium in which angle multiplex recording has been performed as mentioned above, when content associative reproduction (search) is performed, a technique known as associative recording is utilized for instantly searching required information from the information multiplex-recorded in the same position in the holographic recording medium.

For example as described in 10 Nov. 1999/Vol. 38, No. 32/APPLIED OPTICS p6779-6784, by projecting only an object beam onto a holographic recording medium on which information has been recorded to thereby allow the object beam to display the data desired to be reproduced or a part thereof, a diffraction beam of the object beam is emitted in the direction same as that of a reference beam upon recording according to the correlation with the data desired to be reproduced from a lot of data pages recorded on the holographic recording medium. This diffraction beam is detected by an address detector constituted by a plurality of CCDs or imaging elements or a photo detector array.

If the diffraction beam of the object beam is detected by the address detector as mentioned above, the photo detector array or the like constituting the address detector must separately detect the incident diffraction beams according to the spacing of the incident angle modulation of the reference beam upon recording so as not to cause mutual crosstalk.

Generally, the spacing of the incident angle of the reference beam upon recording or the modulation angle spacing is often set in the range of from 10 millidegrees to 1 degree.

If, for example, a beam diameter of the reference beam of 0.3 mm and a modulation spacing of the incident angle of 100 millidegrees are employed, the distance of the address detector with respect to a holographic recording medium must be set to approximately 20 cm in order to separate beam spots on the address detector so as to prevent mutual overlapping. If the modulation angle spacing is reduced in order to increase the recording capacity of a holographic recording medium, the address detector must be located at a distance further away from the holographic recording medium for preventing the overlapping of the beam diameters on the address detector. Thus, a problem arises that the volume of an apparatus increases.

Moreover, if the beam diameters of the reference beam and the object beam are reduced, the utilization efficiency of the reference beam is lowered, causing new problems that a recording rate and the contrast of interference fringes are lowered.

DISCLOSURE OF THE INVENTION

This invention has been made in view of the abovementioned problems. Accordingly, it is an object of the invention to provide a holographic recording method, a holographic recording apparatus, a holographic memory reproducing method, a holographic memory reproducing apparatus, a holographic recording and reproducing apparatus, and a holographic recording medium, in each of which the distance between an address detector and a holographic recording medium can be reduced without decreasing the beam diameter of an object beam and increasing the angle modulation spacing of a reference beam.

The present inventor has conducted intensive studies and has consequently found that, by transforming the shape of a reference beam into an elongated shape having a minor axis coincident with an angle modulation direction, the distance of an address detector with respect to a holographic recording medium can be shortened without reducing the beam diameter of the object beam and the maximum beam diameter of the reference beam and without increasing an angle modulation spacing.

In summary, the above-described objectives are achieved by the following embodiments of the present invention.

(1) A holographic recording method comprising: splitting a laser beam from a laser beam source into an object beam and a reference beam; modulating an intensity of the object beam according to information to be recorded; modulating an incident angle of the reference beam onto a holographic recording medium; and projecting each of the object beam and the reference beam onto the holographic recording medium to thereby form interference fringes, wherein a beam shape of the reference beam is an elongated shape having a minor axis in a plane containing incident optical axes of the reference beam for the respective incident angles and having a major axis in a plane orthogonal to the plane.

(2) The holographic recording method according to (1), wherein the major axis of the elongated beam shape of the reference beam is coincident with an outer diameter of a beam shape of the object beam.

(3) The holographic recording method according to (1) or (2), wherein the beam shape of the reference beam is one of an elliptical shape and a rectangular shape.

(4) The holographic recording method according to (1) or (2), wherein a ratio between the minor axis and the major axis of the elongated shape is 2:3 to 3:8.

(5) A holographic recording apparatus, comprising: a laser beam source; a beam splitter which splits a laser beam emitted from this laser beam source into an object beam and a reference beam; an object optical system which guides the object beam split by this beam splitter to a holographic recording medium; and a reference optical system which guides the reference beam to the holographic recording medium, wherein: the reference optical system is configured to include: a beam shaping optical system which transforms a beam shape of the reference beam into an elongated shape; and an angle modulator which guides the reference beam having the beam shape transformed into the elongated shape by this beam shaping optical system to the holographic recording medium with an incident angle modulated, which are arranged in this order from the side of the beam splitter; the object optical system is configured to include: a spatial light modulator which modulates an intensity of the object beam according to information to be recorded; and a Fourier lens, which are arranged in this order from the side of the beam splitter; and the beam shaping optical system is configured such that a minor axis of the elongated shape is coincident with an angle multiplex direction by means of the angle modulator.

(6) The holographic recording apparatus according to (5), wherein the beam shaping optical system comprises at least one cylindrical lens which narrows the beam shape of the reference beam in a direction of the minor axis.

(7) The holographic recording apparatus according to (5) or (6), wherein the beam shaping optical system is configured to transform the beam shape of the reference beam into one of an elliptical shape and a rectangular shape.

(8) A holographic memory reproducing method for reproducing information recorded on a holographic recording medium which has a holographic recording region in which the information is angle-multiplex-recorded as interference fringes of an object beam and a reference beam, the holographic recording region having a recording unit formed into an elongated shape as viewed from an incident direction of one of the object beam and the reference beam, the elongated shape having a minor axis coincident with a direction of angle multiplex recording, the method comprising: projecting a search-specific laser beam provided with search data onto the holographic recording medium along the same optical axis as that of the object beam to thereby generate a plurality of diffraction beams on lines extending the optical axis of the reference beam having passed through the holographic recording medium; receiving these diffraction beams by an address detector in which a distance from the holographic recording medium is set such that beam spots on lines extending the reference beam having passed through the holographic recording medium for respective incident angles are adjacent to each other with a spacing therebetween on a light receiving surface; allowing the incident angle of the reference beam which angle corresponds to a beam spot having a maximum light intensity among a plurality of the received beam spots to serve as an address of the search data; and receiving, on a line extending the optical axis of the search-specific laser beam having passed through the holographic recording medium, a diffraction beam generated by a reproduction beam projected along the optical axis of the reference beam by means of a two-dimensional photodetector using this address to thereby reproduce the information.

(9) The holographic memory reproducing method according to (8), wherein the reproduction beam is emitted from a light emitting point corresponding to the address in a light emitting array capable of emitting the reproduction beam from a plurality of light emitting point positions each of which provides the same incident angle as the incident angle to the holographic recording medium upon the angle multiplex recording.

(10) A holographic memory reproducing apparatus for reproducing information recorded on a holographic recording medium which has a holographic recording region in which the information is angle-multiplex-recorded as interference fringes of an object beam and a reference beam, the holographic recording region having a recording unit formed into an elongated shape as viewed from an incident direction of one of the object beam and the reference beam, the elongated shape having a minor axis coincident with a direction of angle multiplex recording, the holographic memory reproducing apparatus comprising: a reproducing optical system which projects a reproduction beam onto the holographic recording medium along the same optical axis as that of the reference beam; a search optical system which projects a search beam onto the holographic recording medium along the same optical axis as that of the object beam; an address detector which is arranged on a line extending the optical axis of the reference beam having passed through the holographic recording medium; and a two-dimensional photodetector which is arranged on a line extending the optical axis of the search beam having passed through the holographic recording medium, wherein a distance of the address detector from the holographic recording medium is set such that beam spots on lines extending the reference beam having passed through the holographic recording medium for respective incident angles are adjacent to each other with a spacing therebetween on a light receiving surface.

(11) The holographic memory reproducing apparatus according to (10) wherein the reproducing optical system comprises a light emitting array which emits the reproduction beam from a plurality of light emitting point positions each of which provides the same incident angle as the incident angle of the reference beam to the holographic recording medium upon the angle multiplex recording.

(12) The holographic memory reproducing apparatus according to (11), comprising an address detector which is arranged on a line extending the optical axis of the reference beam having passed through the holographic recording medium, wherein a distance of this address detector from the holographic recording medium is set such that beam spots on lines extending the reference beam having passed through the holographic recording medium for respective incident angles are adjacent to each other with a spacing therebetween on a light receiving surface.

(13) A holographic recording and reproducing apparatus comprising: a laser beam source; a beam splitter which splits a laser beam emitted from this laser beam source into an object beam and a reference beam; an object optical system which guides the object beam split by this beam splitter to a holographic recording medium; a reference optical system which guides the reference beam to the holographic recording medium; an address detector which is arranged on a line extending an optical axis of the reference beam having passed through the holographic recording medium; and a two-dimensional photodetector which is arranged on a line extending an optical axis of the object beam having passed through the holographic recording medium, wherein: the reference optical system is configured to include: a beam shaping optical system which transforms a beam shape of the reference beam into an elongated shape; and an angle modulator which guides the reference beam having the beam shape transformed into the elongated shape by this beam shaping optical system to the holographic recording medium with an incident angle modulated, which are arranged in this order from the side of the beam splitter; the object optical system is configured to include: a spatial light modulator which modulates an intensity of the object beam according to information to be recorded; and a Fourier lens, which are arranged in this order from the side of the beam splitter; the beam shaping optical system is configured such that a minor axis of the elongated shape is coincident with an angle multiplex direction by means of the angle modulator; and a distance of the address detector from the holographic recording medium is set such that beam spots on lines extending the reference beam having passed through the holographic recording medium for respective incident angles are adjacent to each other with a spacing therebetween on a light receiving surface.

(14) The holographic recording and reproducing apparatus according to (13), wherein the major axis of the elongated shape of the reference beam is coincident with an outer diameter of a beam shape of the object beam.

(15) The holographic recording and reproducing apparatus according to (13) or (14), wherein the beam shaping optical system transforms the beam shape of the reference beam into one of an elliptical shape and a rectangular shape.

(16) The holographic recording and reproducing apparatus according to (13), (14) or (15), wherein the beam shaping optical system comprises at least one cylindrical lens which narrows the beam shape of the reference beam in a direction of the minor axis.

(17) A holographic recording medium having a holographic recording region in which information is angle-multiplex-recorded as interference fringes of an object beam and a reference beam, wherein the holographic recording region has a recording unit which is formed into an elongated shape as viewed from an incident direction of one of the object beam and the reference beam and a minor axis of the elongated shape is coincident with a direction of angle multiplex recording.

(18) The holographic recording medium according to (17), wherein a shape of the holographic recording region is one of an elliptical shape and a rectangular shape as viewed from the incident direction of one of the object beam and the reference beam.

BEST MODE FOR CARRYING OUT THE INVENTION

The abovementioned object is achieved by providing, in a reference optical system in a holographic recording and reproducing apparatus, a beam shaping optical system for transforming the beam shape of a reference beam into an elliptical shape to thereby allow the minor axis of the elliptical shape to be coincident with an incident angle modulation direction of the reference beam with respect to a holographic recording medium, whereby the distance of an address detector with respect to the holographic recording medium is set such that a beam spot of the reference beam on a light receiving surface thereof is prevented from overlapping with an adjacent beam spot.

First Embodiment

A first embodiment of the present invention will next be described with reference to FIGS. 1 and 2.

Figure 1:
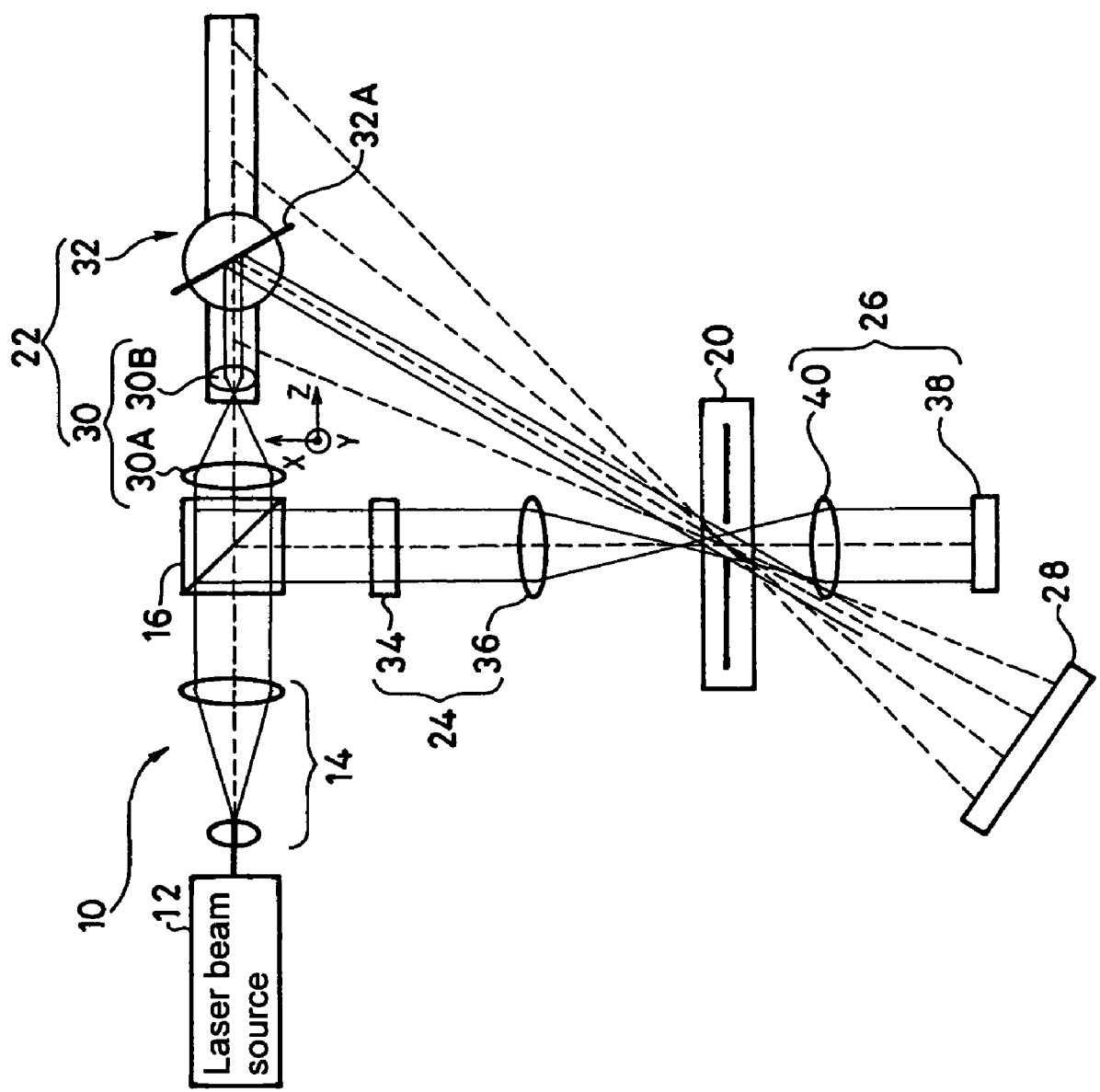
FIG. 1 is an optical system diagram showing a holographic recording and reproducing apparatus according to a first embodiment of the present invention.
Figure 2:
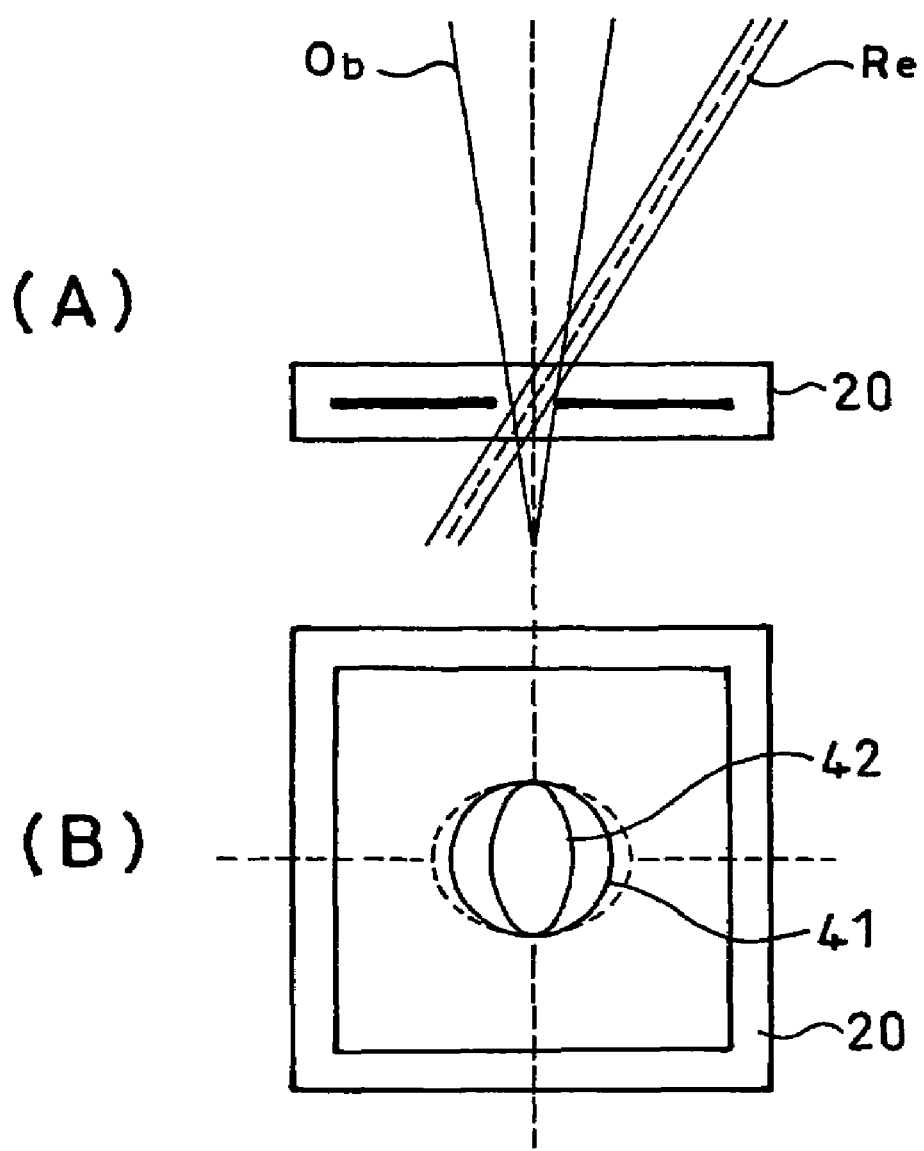
FIG. 2 is a schematic diagram showing the relationship between a reference beam and an object beam on a holographic recording medium in the holographic recording and reproducing apparatus.

As shown in FIG. 1, a holographic recording and reproducing apparatus 10 according to the first embodiment includes: a laser beam source 12; a beam expander 14 for expanding the beam diameter of the laser beam emitted from this laser beam source 12; a beam splitter 16 which splits this laser beam having the beam diameter expanded by this beam expander 14 into a transmission beam and a reflection beam; a reference optical system 22 for guiding the transmission beam from the beam splitter 16 to a holographic recording medium 20 as a reference beam; an object optical system 24 for guiding the reflection beam to the abovementioned holographic recording medium 20 as an object beam; an imaging optical system 26 which is arranged on a line extending the optical axis of the abovementioned object beam having passed through the holographic recording medium 20; and an address detector 28 which is arranged on a line extending the optical axis of the abovementioned reference beam having passed through the abovementioned holographic recording medium 20.

The abovementioned reference optical system 22 is configured to include a beam shaping optical system 30 and an angle modulator 32 in this order from the side of the abovementioned beam splitter 16.

Further, the abovementioned object optical system 24 is configured to include a spatial light modulator 34 and a Fourier lens 36 in this order from the side of the abovementioned beam splitter 16.

The abovementioned imaging optical system 26 is configured to include a two-dimensional photodetector 38 which is formed of imaging elements and an imaging lens 40 which is arranged between this two-dimensional photodetector 38 and the abovementioned holographic recording medium 20.

The abovementioned beam shaping optical system 30 is configured such that the circular beam shape of the reference beam is transformed into, for example, an elliptical shape denoted by the numeral 42 as shown in FIG. 2(B). Specifically, the abovementioned beam shaping optical system 30 is constituted by two cylindrical lenses 30A and 30B each serving as a convex lens in an X-axis direction in FIG. 1. In FIG. 1, the optical axis of the transmission beam of the beam splitter 16 is defined as a Z-axis, and the direction orthogonal to the Z-axis and the paper plane is defined as a Y-axis. Further, the direction orthogonal to the Z-axis and the Y-axis is defined as an X-axis.

The abovementioned cylindrical lens 30A is arranged closer to the beam splitter 16 than to the cylindrical lens 30B and has a focal length longer than that of the cylindrical lens 30B. In addition, the cylindrical lens 30B is provided so as to transform the beam converged through the cylindrical lens 30A into a collimated beam. Therefore, the reference beam is incident on the abovementioned angle modulator 32 as the collimated beam having an elliptical beam shape with the beam diameter unchanged in the Y-direction in FIG. 1 and with the beam diameter reduced in the X-direction.

The angle modulator 32 is similar to that conventionally used and includes a mirror 32A which slides on the optical axis of the reference beam and rotates according to the sliding position such that the incident reference beam is reflected in a direction toward the holographic recording medium 20.

The spatial light modulator 34 in the abovementioned object optical system 24 amplitude-modulates the object beam according to the information to be recorded. The object beam amplitude-modulated by this modulator passes through the Fourier lens 36 and is projected onto a position on the holographic recording medium 20 so as to overlap with the abovementioned reference beam.

The abovementioned imaging optical system 26 is arranged in a position to which, when a laser beam for reproduction (a reproduction beam) is projected onto the holographic recording medium 20 from the direction same as that of the reference beam of the abovementioned reference optical system 22, the generated diffraction beam thereof is directed.

Figure 3:
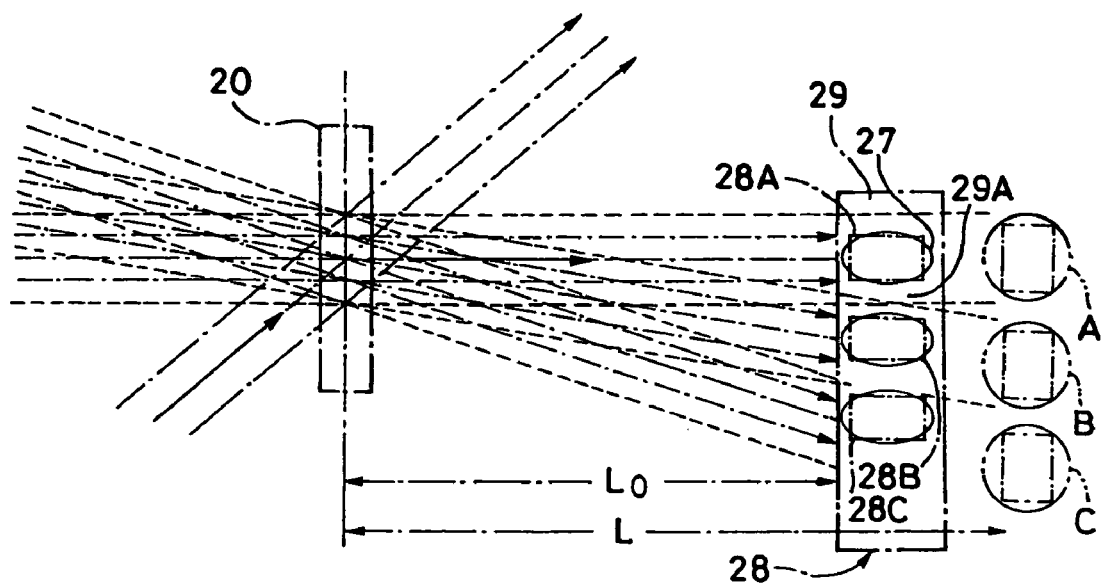
FIG. 3 is a plan view schematically showing optical paths of the reference beam, an address detector, and beam spots of the reference beam on a light receiving surface thereof in the holographic recording and reproducing apparatus.

As shown in FIG. 3, the abovementioned address detector 28 is constituted by imaging elements or an array of two-dimensional photodetectors 28A, 28B, and so on, and the distance from the abovementioned holographic recording medium 20 is set such that beam spots 27 on lines extending the abovementioned reference beam having passed through the holographic recording medium 20 for respective incident angles are adjacent to each other with a spacing 29A on a light receiving surface 29.

Next, a description will be given of a process for recording information on and reproducing the information from the holographic recording medium 20 by means of the abovementioned holographic recording and reproducing apparatus 10.

The beam diameter of the laser beam emitted from the laser beam source 12 is expanded by the beam expander 14. The laser beam passing through the beam splitter 16 enters the reference optical system 22 as the reference beam, and the reflection beam enters the object optical system 24 as the object beam.

In the beam shaping optical system 30, the reference beam is narrowed in the X-axis direction in FIG. 1 by the two cylindrical lenses 30A and 30B and is transformed into a beam having an elliptical beam shape denoted by the numeral 42 in FIG. 2(B). The reference beam having the elliptical beam shape is reflected from the mirror 32A in the angle modulator 32 and is projected onto the holographic recording medium 20 with the reflection angle thereof or the incident angle modulated.

On the other hand, the abovementioned object beam is amplitude-modulated in the spatial light modulator 34 according to the information to be recorded and is then projected onto the holographic recording medium 20 through the Fourier lens 36.

The object beam Ob projected onto the holographic recording medium 20 has a condition shown in FIG. 2(A), and the beam shape thereof is a circular shape 41 shown in FIG. 2(B). The reference beam Re having the abovementioned elliptical beam shape is projected so as to overlap with the object beam having this circular shape 41 to thereby form the interference fringes of the object beam and the reference beam in the elliptical shape denoted by the numeral 42 in FIG. 2(B). Therefore, this elliptical shape 42 serves as a unit of holographic recording.

When the information recorded on the abovementioned holographic recording medium 20 is reproduced, all the pixels of the abovementioned spatial light modulator 34 are turned off (into a state in which light is not transmitted). In this case, the reference optical system 22 serves as a reproduction optical system to project the laser beam for reproduction onto the holographic recording medium 20.

At this time, the incident angle of the laser beam for reproduction is controlled by the abovementioned angle modulator 32 according to the address of the information (data page) desired to be reproduced. A diffraction beam corresponding to the object beam upon recording mentioned above is generated by the projection of this laser beam for reproduction and forms an image on the two-dimensional photodetector 38 through the imaging lens 40.

When data search is performed, the object optical system 24 serves as a search optical system. That is, in the spatial light modulator 34, a search beam corresponding to the object beam is provided with search data, and the search beam is projected onto the holographic recording medium 20. In this manner, in the holographic recording medium 20, diffraction beams are generated in the angular directions same as those of the reference beam upon recording and are received by the address detector 28.

Therefore, the diffraction beams of the same number as the number of the modulation steps of the incident angle of the reference beam upon recording are incident on the address detector 28.

The diffraction beam corresponding to the search data provided by the abovementioned spatial light modulator 34 has a maximum detection light amount. Therefore, among the abovementioned plurality of diffraction beams, this beam is recognized as the address (the incident angle) of the search data.

Next, the reproduction beam is set to have the above detected address (the incident angle), and the search data is reproduced by the normal reproduction described above to thereby complete the data search.

Although the light beams of the same number as the modulation step number of the reference beam upon recording are incident on the address detector 28 as described above, the beam shape thereof is the elliptical shape denoted by the numeral 42 in FIG. 2(B). Therefore, as shown in FIG. 3, the light beams can be densely arranged in the minor axis direction of the elliptical shape as compared to the case of a circular shape.

Therefore, the distance to the holographic recording medium 20 is L0 in contrast to a distance L when the shape of the incident beam is a circle denoted by characters A, B, C, and so on in FIG. 3, thereby enabling the installation of the address detector 28 at a closer distance. Thus, the volume of the apparatus is reduced.

Figure 4:
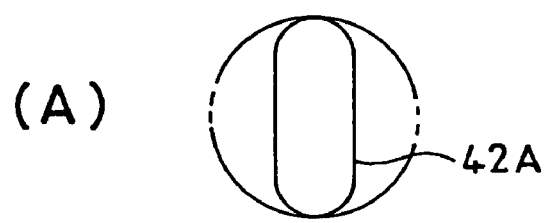
FIG. 4 is a plan view schematically showing different beam shapes of the reference beam employed in the present invention.
Figure 4:
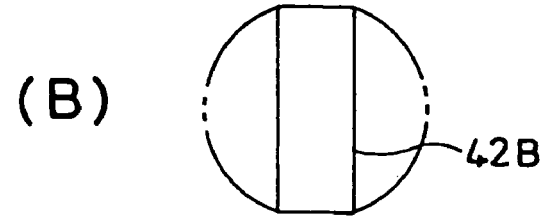

Further, in the first embodiment above, the beam shaping optical system 30 transforms the circular beam shape of the reference beam into the elliptical shape, but the present invention is not limited thereto. An elongated shape including an elliptical shape, an oval shape, and a rectangular shape may be employed. For example, as shown in FIG. 4(A), an oval shape having an aspect ratio still higher than that of an ellipse may be employed. Moreover, a substantially rectangular shape as shown in FIG. 4(B) may be employed which is formed by linearizing the upper and lower ends of the reference beam in the Y-direction in FIG. 1 in advance by means of masking or the like.

A detailed description will be given of the relationship among the limit of separate detection of the abovementioned incident beam on the light receiving surface of the abovementioned address detector 28, the distance between the holographic recording medium 20 and the light receiving surface of the address detector 28, and the beam diameter.

Figure 5:
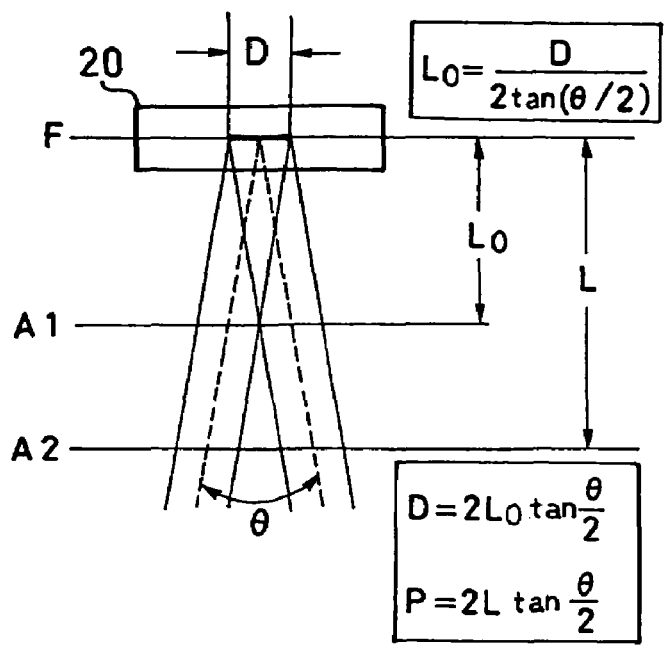
FIG. 5 is a cross-sectional view geometrically showing the correlation among the beam diameter of the reference beam projected onto the holographic recording medium, the modulation angle between two adjacent reference beams, and the distance between the address detector and the holographic recording medium in the first embodiment.

FIG. 5 shows a geometrical condition when light beams adjacent to each other on the light receiving surface of the address detector 28 are separately detected.

The size of the recording layer (the beam diameter of the reference beam) in the holographic recording medium 20 is defined as D, and the spacing of the incident angle of the reference beam (a modulation angle spacing) is defined as θ. Further, the distance between the holographic recording medium 20 (a surface denoted by a character F in FIG. 5) and the light receiving surface 29 (a surface A1 in FIG. 5) of the address detector 28 is defined as L0, which is required for separately detecting the adjacent light beams. Then, the relational equation L0=D/2 tan (θ/2) holds.

Figure 6:
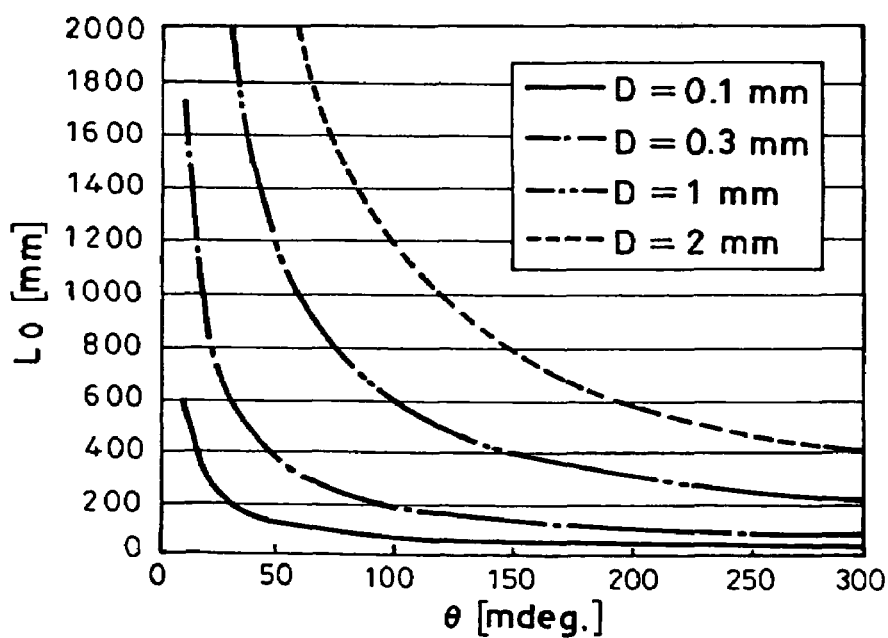
FIG. 6 is a graph showing the relationship among the diameter of a laser beam upon recording, the modulation angle spacing of the reference beam, and the distance between the holographic recording medium and the address detector.

FIG. 6 represents the relational equation for each of different diameters D of the light beam (the beam diameter). θ depends on optical system parameters upon recording, the thickness of the holographic recording medium, and the like, but is generally set in the range of from 10 millidegrees to 1 degree. As can be seen from the above relational equation, if, for example, the reference beam having a beam diameter D=1 mm is employed, L0 may be 5,000 mm (5 m) or more at the maximum, which is too large for an apparatus for holographic recording and reproducing.

In view of the above, the various parameters in FIG. 5 above can be controlled by, for example, changing the design of the holographic recording medium or the optical systems. However, for all the cases, new problems arise that the recording capacity, the data reproduction rate, and the like of the holographic recording medium are lowered. For example, if θ is increased, the recording capacity decreases. Further, if the defocus amount of the object beam is decreased to reduce the beam diameter D, the utilization efficiency of the reference beam is lowered to cause the recording rate and the contrast of interference fringes to decrease.

In the first embodiment, the beam diameter D in FIGS. 5 and 6 can be substantially reduced according to the aspect ratio of the ellipse. For example, if the minor axis of the ellipse is set to ½ of the major axis, the beam diameter D in FIGS. 5 and 6 can be substantially reduced to ½ without reducing the defocus amount of the object beam.

Desirably, the ratio between the minor axis and the major axis in the abovementioned elongated shape is 2:3 to 3:8.

Second Embodiment

Figure 7:
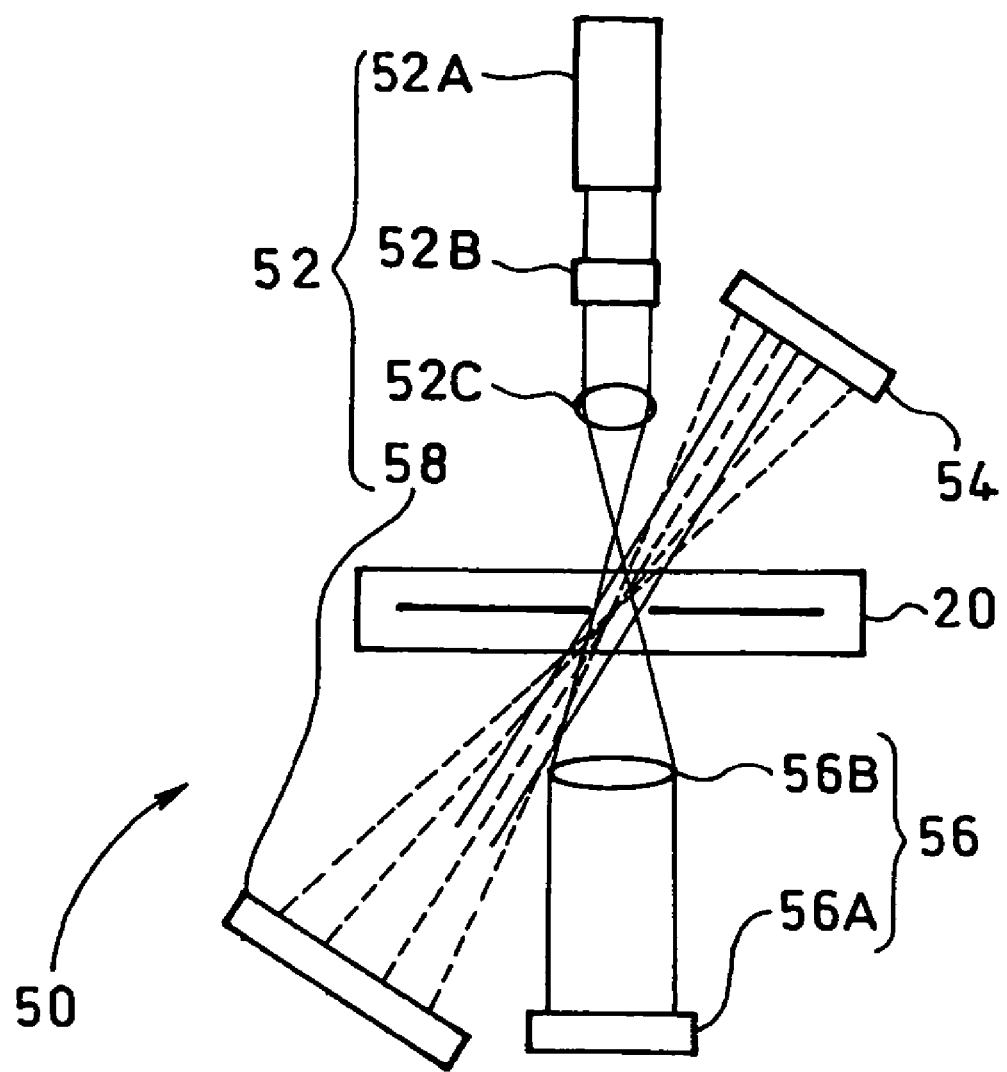
FIG. 7 is an optical system diagram showing a holographic memory reproducing apparatus according to a second embodiment of the present invention.

A second embodiment shown in FIG. 7 is a reproducing-specific apparatus for reproducing information recorded on the holographic recording medium 20 in which angle multiplex recording is performed by use of the reference beam having the elongated beam shape by means of the abovementioned holographic recording and reproducing apparatus 10 or the like.

This holographic memory reproducing apparatus 50 is configured to include: a data search optical system 52 which is employed only for data search; a reproduction beam source 54 for forming a reproduction beam; and an imaging optical system 56 for reproducing information from a diffraction beam generated by projecting the reproduction beam from the reproduction beam source 54 onto the holographic recording medium 20.

The abovementioned data search optical system 52 is configured to include: a laser beam source 52A; a search-specific spatial light modulator 52B for providing a laser beam emitted from the laser beam source 52A to the abovementioned holographic recording medium 20 with search data; a Fresnel lens 52C; and an address detector 58 for receiving a diffraction beam generated in the holographic recording medium 20 when the laser beam from the laser beam source 52A is projected onto the holographic recording medium 20 through the search-specific spatial light modulator 52B and the Fresnel lens 52C.

Further, the abovementioned reproduction beam source 54 is constituted by a laser array having light-emitting points of the same number as the number of the modulation steps according to the angle modulation spacing upon angle multiplex recording to the holographic recording medium 20. In addition to the laser array, a surface emitting laser or a light emitting diode may be employed as the reproduction beam source 54.

The abovementioned imaging optical system 56 is configured to include a two-dimensional photodetector 56A for receiving, via an imaging lens 56B, a diffraction beam generated in the holographic recording medium 20 by the projection of the reproduction beam from the reproduction beam source 54.

Moreover, the abovementioned address detector 58 has a configuration similar to that of the address detector 28 in the abovementioned holographic recording and reproducing apparatus 10.

In the holographic memory reproducing apparatus 50 of the second embodiment, when data search is performed, the laser beam from the laser beam source 52A is modulated in the search-specific spatial light modulator 52B according to the data to be searched and is projected onto the holographic recording medium 20 through the Fresnel lens 52C.

In this manner, diffraction beams of the same number as the number of the angle modulation steps upon recording are generated from the holographic recording medium 20 and are received by the address detector 58. Among the signals received by the address detector 58, the signal having the highest output represents the address of the desired data.

In this embodiment, since the search-specific spatial light modulator 52B is employed only for data search, the image quality thereof is not required to be as high as that of the spatial light modulator employed upon recording. Therefore, the apparatus as a whole can be constructed in a small size and at low cost.

Further, the first embodiment above is related to a holographic recording and reproducing apparatus, and the second embodiment is related to a holographic memory reproducing apparatus for reproducing-only. However, the present invention is not limited to these embodiments and is applicable to a recording apparatus alone in a holographic recording and reproducing apparatus.

INDUSTRIAL APPLICABILITY

In the present invention, the length of the beam spot of the diffraction beam on the address detector upon search is reduced in the angle modulation direction. Therefore, the distance of the address detector with respect to the holographic recording medium can be reduced, and the address detector can be made compact.

The invention claimed is:
1. A holographic recording method comprising:
splitting a laser beam from a laser beam source into an object beam and a reference beam;
modulating an intensity of the object beam according to information to be recorded;
modulating an incident angle of the reference beam onto a holographic recording medium; and
projecting each of the object beam and the reference beam onto the holographic recording medium to thereby form interference fringes,
wherein a beam shape of the reference beam is an elongated shape having a minor axis in a plane containing incident optical axes of the reference beam for the respective incident angles and having a major axis in a plane orthogonal to the plane, and the major axis of the elongated beam shape of the reference beam is coincident with an outer diameter of a beam shape of the object beam.

2. The holographic recording method according to claim 1, wherein the beam shape of the reference beam is one of an elliptical shape and a rectangular shape.

3. The holographic recording method according to claim 2, wherein a ratio between the minor axis and the major axis of the elongated shape is 2:3 to 3:8.

4. The holographic recording method according to claim 1, wherein a ratio between the minor axis and the major axis of the elongated shape is 2:3 to 3:8.

5. A holographic recording apparatus, comprising:

a laser beam source;

a beam splitter which splits a laser beam emitted from the laser beam source into an object beam and a reference beam;

an object optical system which guides the object beam split by the beam splitter to a holographic recording medium; and a reference optical system which guides the reference beam to the holographic recording medium, wherein the reference optical system is configured to include:

a beam shaping optical system which transforms a beam shape of the reference beam into an elongated shape; and an angle modulator which guides the reference beam having the beam shape transformed into the elongated shape by the beam shaping optical system to the holographic recording medium with an incident angle modulated, which are arranged in this order from the side of the beam splitter;

the object optical system is configured to include:

a spatial light modulator which modulates an intensity of the object beam according to information to be recorded; and a Fourier lens, which are arranged in this order from the side of the beam splitter;

the beam shaping optical system is configured such that a minor axis of the elongated shape is coincident with an angle multiplex direction by means of the angle modulator, and a major axis of the elongated shape of the reference beam is coincident with an outer diameter of a beam shape of the object beam.

6. The holographic recording apparatus according to claim 5, wherein the beam shaping optical system comprises at least one cylindrical lens which narrows the beam shape of the reference beam in a direction of the minor axis.

7. The holographic recording apparatus according to claim 5, wherein the beam shaping optical system is configured to transform the beam shape of the reference beam into one of an elliptical shape and a rectangular shape.

8. A holographic recording and reproducing apparatus comprising:

a laser beam source;

a beam splitter which splits a laser beam emitted from this laser beam source into an object beam and a reference beam;

an object optical system which guides the object beam split by this beam splitter to a holographic recording medium;

a reference optical system which guides the reference beam to the holographic recording medium;

an address detector which is arranged on a line extending an optical axis of the reference beam having passed through the holographic recording medium; and a two-dimensional photodetector which is arranged on a line extending an optical axis of the object beam having passed through the holographic recording medium, wherein the reference optical system is configured to include:

a beam shaping optical system which transforms a beam shape of the reference beam into an elongated shape; and an angle modulator which guides the reference beam having the beam shape transformed into the elongated shape by this beam shaping optical system to the holographic recording medium with an incident angle modulated, which are arranged in this order from the side of the beam splitter;

the object optical system is configured to include:

a spatial light modulator which modulates an intensity of the object beam according to information to be recorded; and a Fourier lens, which are arranged in this order from the side of the beam splitter;

the beam shaping optical system is configured such that a minor axis of the elongated shape is coincident with an angle multiplex direction by means of the angle modulator; and a distance of the address detector from the holographic recording medium is set such that beam spots on lines extending the reference beam having passed through the holographic recording medium for respective incident angles are adjacent to each other with a spacing therebetween on a light receiving surface.

9. The holographic recording and reproducing apparatus according to claim 8, wherein the major axis of the elongated shape of the reference beam is coincident with an outer diameter of a beam shape of the object beam.

10. The holographic recording and reproducing apparatus according to claim 9, wherein the beam shaping optical system transforms the beam shape of the reference beam into one of an elliptical shape and a rectangular shape.

11. The holographic recording and reproducing apparatus according to claim 9, wherein the beam shaping optical system comprises at least one cylindrical lens which narrows the beam shape of the reference beam in a direction of the minor axis.

12. The holographic recording and reproducing apparatus according to claim 8, wherein the beam shaping optical system transforms the beam shape of the reference beam into one of an elliptical shape and a rectangular shape.

13. The holographic recording and reproducing apparatus according to claim 12, wherein the beam shaping optical system comprises at least one cylindrical lens which narrows the beam shape of the reference beam in a direction of the minor axis.

14. The holographic recording and reproducing apparatus according to claim 8, wherein the beam shaping optical system comprises at least one cylindrical lens which narrows the beam shape of the reference beam in a direction of the minor axis.

* * * * *